United States Patent
Umeyama et al.

(10) Patent No.: US 10,320,002 B2
(45) Date of Patent: Jun. 11, 2019

(54) METHOD FOR MANUFACTURING ELECTRODE SHEET AND ELECTRODE SHEET

(71) Applicant: TOYOTA JIDOSHA KABUSHIKI KAISHA, Toyota-shi, Aichi-ken (JP)

(72) Inventors: Hiroya Umeyama, Okazaki (JP); Tatsuya Hashimoto, Osaka (JP); Yusuke Fukumoto, Toyonaka (JP); Naoto Onodera, Hirakata (JP); Koichi Toriyama, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 244 days.

(21) Appl. No.: 15/186,639

(22) Filed: Jun. 20, 2016

(65) Prior Publication Data
US 2017/0018779 A1    Jan. 19, 2017

(30) Foreign Application Priority Data

Jul. 13, 2015    (JP) ................................. 2015-139516

(51) Int. Cl.
| | |
|---|---|
| H01M 4/62 | (2006.01) |
| H01M 4/133 | (2010.01) |
| H01M 4/04 | (2006.01) |
| H01M 4/131 | (2010.01) |
| H01M 4/134 | (2010.01) |
| H01M 4/36 | (2006.01) |
| H01M 4/70 | (2006.01) |
| H01M 4/583 | (2010.01) |
| H01M 10/052 | (2010.01) |

(52) U.S. Cl.
CPC ......... H01M 4/622 (2013.01); H01M 4/0433 (2013.01); H01M 4/131 (2013.01); H01M 4/133 (2013.01); H01M 4/134 (2013.01); H01M 4/366 (2013.01); H01M 4/70 (2013.01); H01M 4/583 (2013.01); H01M 10/052 (2013.01)

(58) Field of Classification Search
CPC ........................................................ H01M 4/00
USPC ........................................................ 429/217
See application file for complete search history.

(56) References Cited

U.S. PATENT DOCUMENTS

| | | | |
|---|---|---|---|
| 2006/0210608 A1 | 9/2006 | Honda et al. | |
| 2011/0176255 A1* | 7/2011 | Sasaki | H01G 9/016 361/502 |
| 2015/0099167 A1* | 4/2015 | Oshima | H01M 4/505 429/199 |

FOREIGN PATENT DOCUMENTS

| | | |
|---|---|---|
| CN | 102227832 A | 10/2011 |
| EP | 2757620 A1 | 7/2014 |
| JP | 2004-262974 A | 9/2004 |
| JP | 2013-77560 A | 4/2013 |
| JP | 2013143304 A | 7/2013 |
| KR | 1020060095368 A | 8/2006 |

(Continued)

Primary Examiner — James Lee
(74) Attorney, Agent, or Firm — Sughrue Mion, PLLC

(57) ABSTRACT

A method for manufacturing an electrode sheet includes the steps of forming a granulated material containing a plurality of granules; forming an electrode mixture layer by molding the granulated material into a sheet; and placing the electrode mixture layer on electrode current collector foil. The step of forming the granulated material includes the steps of forming a granule containing at least an electrode active material and a binder; and adhering a polyglycerol fatty acid ester to a surface of the granule.

6 Claims, 10 Drawing Sheets

(56) References Cited

FOREIGN PATENT DOCUMENTS

| WO | 2005/004640 A1 | 1/2005 | |
|---|---|---|---|
| WO | WO-2013161305 A1 * | 10/2013 | ............ H01M 4/505 |
| WO | 2014/185365 A1 | 11/2014 | |

* cited by examiner

METHOD FOR MANUFACTURING ELECTRODE SHEET AND ELECTRODE SHEET

This nonprovisional application is based on Japanese Patent Application No. 2015-139516 filed on Jul. 13, 2015 with the Japan Patent Office, the entire contents of which are hereby incorporated by reference.

BACKGROUND OF THE INVENTION

Field of the Invention

The present invention relates to a method for manufacturing an electrode sheet and an electrode sheet.

Description of the Background Art

Japanese Patent Laying-Open No. 2013-77560 discloses a method for manufacturing an electrode sheet, wherein an electrode mixture layer is formed by molding a granulated material into a sheet, and this electrode mixture layer is compression bonded to electrode current collector foil.

SUMMARY OF THE INVENTION

Conventionally, in order to manufacture electrode sheets for nonaqueous electrolyte secondary batteries, a method is commonly used wherein a coating for forming an electrode mixture layer is prepared, and this coating is applied onto electrode current collector foil and dried (hereinafter also referred to as the "coating method"). The coating is a viscous fluid obtained by dispersing an electrode active material, a binder, and the like in a solvent. With the coating method, the binder tends to be unevenly distributed in a thickness direction of the electrode mixture layer. This is because during drying of the coating, convection occurs in the solvent, which causes the binder to migrate to a surface layer of the coating film. Binders generally have poor ion conductivity, and inhibit the migration of ions that carry electricity. Thus, the uneven distribution of the binder over the surface layer of the electrode mixture layer can cause a deterioration of battery performance.

Japanese Patent Laying-Open No. 2013-77560 proposes the method for forming an electrode mixture layer by molding the granulated material into a sheet (hereinafter also referred to as the "granulated material molding method"), as a method different from the coating method. The granulated material is a mass of granules containing an electrode active material, a binder, and the like. The granulated material molding method can significantly improve the uneven distribution of the binder. This is because the amount of a solvent, which is a fundamental cause of the uneven distribution of the binder, is small. With the granulated material molding method, a desired binding property can be achieved with a smaller amount of binder than that used in the coating method, because the uneven distribution of the binder is prevented. The granulated material molding method also allows the thickness of the electrode mixture layer to be increased, which is difficult to achieve in the coating method.

With the granulated material molding method, granules tend to agglomerate during the process of forming the granulated material or the process of conveying the granulated material, for example. In the molding of a thin electrode mixture layer, therefore, surface defects such as streaks, pinholes, and the like, originated from coarse granules due to the agglomeration of granules, become manifest. Moreover, even if an evident surface defect is not formed, variations in the density of the electrode mixture layer may occur due to the agglomeration of granules, leading to a deterioration of battery performance.

Accordingly, the present invention aims to provide a method for manufacturing an electrode sheet based on the granulated material molding method, which improves the quality of an electrode sheet.

[1] A method for manufacturing an electrode sheet includes the steps of forming a granulated material containing a plurality of granules; forming an electrode mixture layer by molding the granulated material into a sheet; and placing the electrode mixture layer on electrode current collector foil. The step of forming the granulated material includes the steps of forming a granule containing at least an electrode active material and a binder; and adhering a polyglycerol fatty acid ester to a surface of the granule.

In the manufacturing method according to [1] above, before the granulated material is molded into a sheet, the polyglycerol fatty acid ester (which may be abbreviated as "PGFE" hereinafter) is adhered to the surface of the granules contained in the granulated material. PGFE imparts lubricity to the granules to prevent agglomeration of the granules in the process of forming the granulated material. In this way, a granulated material with reduced variations in the granule size can be formed. PGFE also prevents the granules from being adhered to one another in the process of conveying the granulated material, so as to increase the fluidity of the granulated material. With the manufacturing method according to [1] above, therefore, the quality of the electrode sheet is improved.

[2] The binder may contain a carboxymethylcellulose-based polymer. Through the combined use of PGFE and the carboxymethylcellulose-based polymer (which may be abbreviated as the "CMC-based polymer" hereinafter), improvement in the quality of the electrode sheet can be expected.

[3] The granulated material preferably has a content of the carboxymethylcellulose-based polymer not less than 0.2 mass % and not more than 1.2 mass %, a content of the polyglycerol fatty acid ester not less than 0.1 mass % and not more than 0.3 mass %, and a total content of the carboxymethylcellulose-based polymer and the polyglycerol fatty acid ester not more than 1.4 mass %.

When the content of the CMC-based polymer and the content of PGFE are adjusted in the above-defined ranges, improvement in the quality of the electrode sheet can be expected.

[4] An electrode sheet includes electrode current collector foil and an electrode mixture layer placed on the electrode current collector foil. The electrode mixture layer contains a plurality of granules. The granules contain at least an electrode active material and a binder. The granules have a polyglycerol fatty acid ester adhered to a surface thereof.

The electrode sheet according to [4] above can exhibit reduced surface defects and reduced variations in the density of the electrode mixture layer, because PGFE is adhered to the surfaces of the granules. Furthermore, in a nonaqueous electrolyte secondary battery including the electrode sheet according to [4] above, because the electrode mixture layer is composed of a group of the granules with a uniform granule size, a uniform electrode reaction can be achieved, and an increase in resistance during high-rate cycling can be prevented.

In the electrode mixture layer, the binder may contain a carboxymethylcellulose-based polymer. Through the combined use of PGFE and the CMC-based polymer, improvement in the quality of the electrode sheet can be expected.

The electrode mixture layer preferably has a content of the carboxymethylcellulose-based polymer not less than 0.2 mass % and not more than 1.2 mass %, a content of the polyglycerol fatty acid ester not less than 0.1 mass % and not more than 0.3 mass %, and a total content of the carboxymethylcellulose-based polymer and the polyglycerol fatty acid ester not more than 1.4 mass %.

When the content of the CMC-based polymer and the content of PGFE satisfy the above-defined relation, improvement in the effect of preventing an increase in resistance can be expected in the nonaqueous electrolyte secondary battery including the electrode sheet.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One exemplary embodiment of the present invention (hereinafter also referred to as the "present embodiment") will be described below by way of example. The present embodiment, however, is not limited thereto. As used herein, the term "electrode" collectively refers to a "negative electrode" and a "positive electrode". That is, the term "electrode sheet" represents at least one of a "negative electrode sheet" and a "positive electrode sheet". The term "electrode mixture layer" represents at least one of a "negative electrode mixture layer" and a "positive electrode mixture layer". The term "electrode active material" represents at least one of a "negative electrode active material" and a "positive electrode active material". The term "electrode current collector foil" represents at least one of "negative electrode current collector foil" and "positive electrode current collector foil".

[Method for Manufacturing Electrode Sheet]

Figure 1:
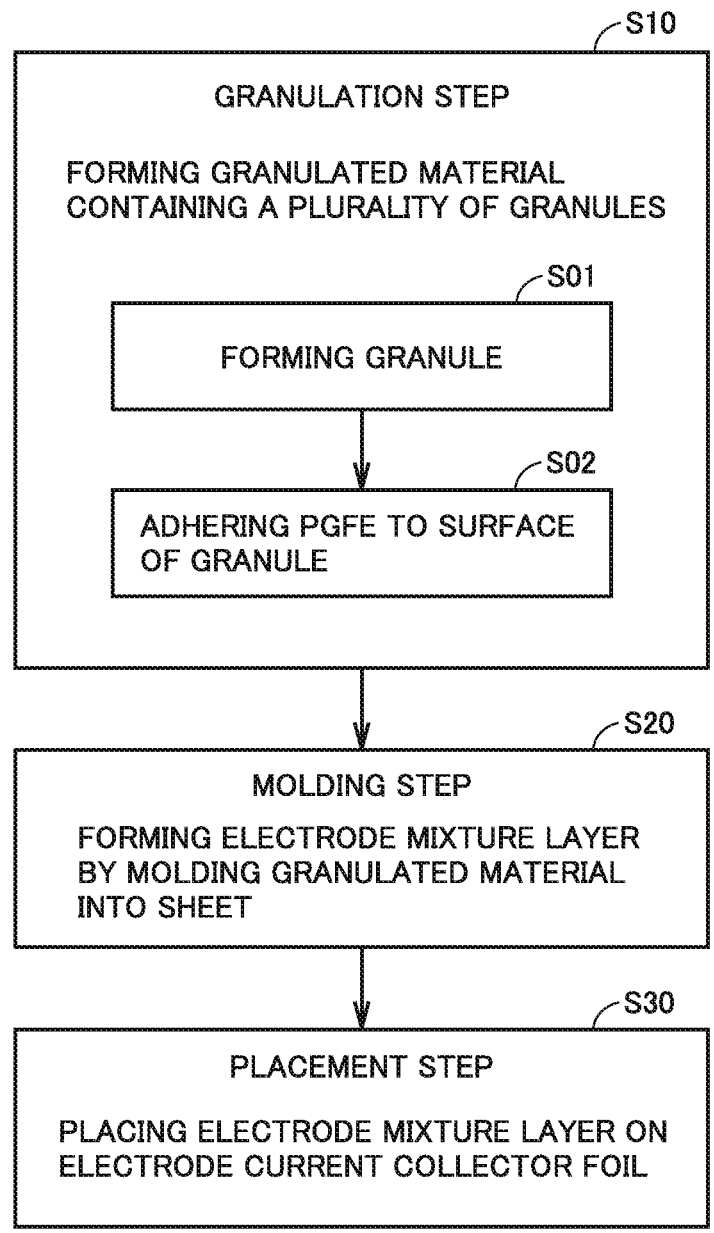
FIG. 1 is a flowchart showing an outline of a method for manufacturing an electrode sheet according to one embodiment of the present invention.

FIG. 1 is a flowchart showing an outline of a method for manufacturing an electrode sheet according to the present embodiment. As shown in FIG. 1, the manufacturing method includes a granulation step (S10), a molding step (S20), and a placement step (S30). Each of these steps will be described below.

[Granulation Step (S10)]

In the granulation step (S10), a granulated material containing a plurality of granules is formed. The granulation step (S10) includes the steps of forming a granule (S01), and adhering PGFE to a surface of the granule (S02). In the present embodiment, PGFE is adhered to the surface of the granule to thereby prevent agglomeration of these granules. In this way, a granulated material with a uniform granule size can be formed.

[Step of Forming Granule (S01)]

Figure 2:
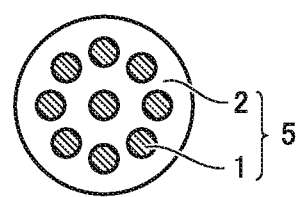
FIG. 2 is a schematic conceptual diagram showing a granule.

In the step (S01), as shown in FIG. 2, a granule 5 containing at least an electrode active material 1 and a binder 2 is formed. The granules are typically formed by wet granulation. Any of various granulation operations may be performed, for example, agitation granulation, fluidized bed granulation, and tumbling granulation. In the case of agitation granulation, a granulator such as, for example, "High Speed Mixers" or "High Flex Gral" from Earth Technica Co., Ltd., may be used. Alternatively, a mixer such as a planetary mixer or the like may be used. In a specific granulation operation, the electrode active material, the binder, and the like, together with a solvent, may be introduced into the agitation vessel of the granulator, and mixed with agitation. The rotation speed of the agitator blades, the agitation time, and the like may be changed as appropriate, in accordance with the powder properties of the electrode active material and the like.

The solvent is preferably an aqueous solvent (water, for example). The use of the aqueous solvent can be expected to mitigate the environmental load. The aqueous solvent may be a solvent made of water alone, or may be a mixed solvent of water and a polar solvent other than water. Examples of the polar solvent may include alcohols such as methanol, ethanol, and isopropyl alcohol; ketones such as acetone; and ethers such as tetrahydrofuran. In view of handleability, water is the most preferable as the aqueous solvent. In the present embodiment, however, the use of a single organic solvent such as N-methyl-2-pyrrolidone (NMP), for example, is not necessarily excluded.

The amount of the solvent used in the step (S01) may be adjusted such that the solids concentration in the mixture is about 75 to 85 mass %, for example. At such a solids concentration, an appropriate shearing load is generated during mixing with agitation, which may allow the granules to be densely formed. As used herein, the term "solids concentration" represents the mass ratio of components other than the solvent in the mixture.

[Electrode Active Material]

The electrode active material may be a negative electrode active material or a positive electrode active material. The negative electrode active material may, for example, be a carbon-based negative electrode active material such as graphite, graphitizable carbon, non-graphitizable carbon, or the like, or may be an alloy-based negative electrode active material containing silicon (Si), tin (Sn), and the like. The negative electrode active material may have a mean particle size of about 5 to 25 μm, for example. As used herein, the term "mean particle size" represents the particle size at a cumulative value of 50% (also referred to as "d50" or a "median size") in the particle size distribution on a volume basis measured using the laser diffraction/scattering method.

The positive electrode active material may be a lithium (Li)-containing metal oxide, for example. Examples of the Li-containing metal oxide may include $LiCoO_2$, $LiNiO_2$, a compound represented by the general formula: LiNi$_a$Co$_b$O$_2$ (where a+b=1, 0<a<1, and 0<b<1), LiMnO$_2$, LiMn$_2$O$_4$, a compound represented by the general formula: LiNi$_a$Co$_b$Mn$_c$O$_2$ (where a+b+c=1, 0<a<1, 0<b<1, and 0<c<1), and LiFePO$_4$. The compound represented by the general formula: LiNi$_a$Co$_b$Mn$_c$O$_2$ may be LiNi$_{1/3}$Co$_{1/3}$Mn$_{1/3}$O$_2$, for example. The positive electrode active material may have a mean particle size of about 5 to 25 µm, for example.

[Binder]

When an aqueous solvent is used, binders such as, for example, the CMC-based polymer, polyacrylic acid (PAA), styrene butadiene rubber (SBR), acrylonitrile-butadiene rubber (NBR), and polytetrafluoroethylene (PTFE) may be used. These binders may be used singly or in a combination of two or more. The binder may be in the form of a powder or a solution. When an organic solvent is used, a binder such as polyvinylidene difluoride (PVDF), for example, may be used.

The binder preferably contains the CMC-based polymer. A binder containing a combination of the CMC-based polymer and SBR may be contemplated, for example. In the present embodiment, the CMC-based polymer represents at least one selected from the group consisting of carboxymethylcellulose, an alkali metal salt of carboxymethylcellulose, an alkaline earth metal salt of carboxymethylcellulose, and an ammonium salt of carboxymethylcellulose. In view of handleability, a sodium salt of carboxymethylcellulose (hereinafter abbreviated as "CMC-Na"), for example, is preferable.

[Other Components]

The granules may also contain a conductive material, for example, in addition to the electrode active material and the binder. Examples of the conductive material may include carbon blacks such as acetylene black and thermal black.

[Granule Size]

The granule size can be adjusted with the rotation speed of the agitation blades and the chopper blades, the solids concentration, and the like. The granules may have a mean granule size of about 0.05 to 3 mm, for example. The mean granule size may be adjusted in accordance with the coating weight (mass per unit area) of the electrode mixture layer. In order to form an electrode sheet for high-rate applications, i.e., an electrode mixture layer that is thin and having a small coating weight, the granules may have a mean granule size of about 0.05 to 1.5 mm, for example.

[Step of Adhering PGFE to Surface of Granule (S02)]

Figure 3:
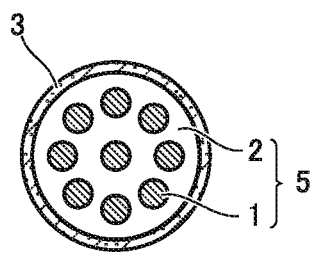
FIG. 3 is a schematic conceptual diagram showing a granule to which PGFE is adhered.

In the step (S02), as shown in FIG. 3, PGFE 3 is adhered to the surface of granule 5. PGFE may be adhered to at least a portion of the surface of the granule. In this way, the granules can be prevented from adhering to one another. In order to enhance the effect of preventing the adhesion, a coating layer containing PGFE is preferably formed on the surface of the granule.

In a specific operation, the granules and PGFE, together with the solvent, may be introduced into the agitation vessel of the granulator, and mixed with agitation. The amount of the solvent used in the step (S02) may be adjusted such that the solids concentration in the mixture is about 65 to 75 mass %, for example. At such a solids concentration, the coating layer of PGFE tends to be uniformly formed.

The polyglycerol fatty acid ester (PGFE) is a compound obtained by the esterification reaction between polyglycerol and a fatty acid (a fatty acid, a fatty acid chloride, or the like), for example. PGFE may be in the form of a powder or a solution. PGFE can be represented by the following formula (I):

$$R^1O-(CH_2-CH(OR^2)-CH_2-O)_n-R^3,\qquad\text{formula (I)}$$

where n represents an integer from 2 or more, and R$^1$, R$^2$, and R$^3$ each independently represent a hydrogen atom or a fatty acid residue, with the proviso that at least any of R$^1$, R$^2$, and R$^3$ is a fatty acid residue.

The fatty acid residue (R$^1$, R$^2$, and R$^3$) may be derived from a saturated fatty acid, or may be derived from an unsaturated fatty acid. The fatty acid residue may be derived from at least one fatty acid selected from the group consisting of stearic acid, oleic acid, caprylic acid, lauric acid, myristic acid, behenic acid, erucic acid, ricinoleic acid, and condensed ricinoleic acid. These types of PGFE may be used singly or in a combination of two or more. In the present embodiment, the fatty acid residue is preferably derived from erucic acid.

The average degree of polymerization of polyglycerol (corresponding to "n" in formula (I)) calculated from the hydroxyl value may, for example, be an integer from 2 to 20, preferably from 4 to 16, and particularly preferably from 6 to 12.

When an aqueous solvent is used, lipophilic PGFE is preferably used. In this case, PGFE has an HLB (hydrophilic-lipophilic balance) value of about 1 to 10, for example, and preferably about 1 to 5. When an organic solvent is used, hydrophilic PGFE is preferably used. In this case, PGFE has an HLB value of about 10 to 20, for example, and preferably about 15 to 20.

[Proportions of Solids Contained in Granulated Material]

The proportions of solids contained in the granulated material may be adjusted as follows, for example. In the following, the proportion of the conductive material is from about 0 to 10 mass %.

SBR (binder): about 0.5 to 1.5 mass %
CMC-based polymer (binder): about 0.1 to 1.4 mass %
PGFE: about 0.1 to 0.35 mass %
Balance: the electrode active material, the conductive material, and the like.

Furthermore, when the content of the CMC-based polymer and the content of PGFE satisfy a specific relation in the granulated material, improvement in the quality of the electrode sheet can be expected. That is, the granulated material preferably has a content of the CMC-based polymer not less than 0.2 mass % and not more than 1.2 mass %, a content of PGFE not less than 0.1 mass % and not more than 0.3 mass %, and a total content of the CMC-based polymer and PGFE not more than 1.4 mass %.

Note that even if the proportions of the solids as shown above are contained, if PGFE is added before forming the granule containing the electrode active material and the binder, the formation of the granule will be difficult, which may rather deteriorate the quality of the electrode sheet. That is, PGFE prevents the adhesion of particles of the electrode active material, thus making the formation of the granule itself difficult. Furthermore, the mixture thus completed cannot be readily molded into a sheet, because of its poor fluidity. Therefore, for example, the electrode active material, the binder, and PGFE should not be mixed in one step, or the binder should not be mixed after mixing the electrode active material and PGFE.

Through the above-described steps, the granulated material containing the granules having PGFE adhered to their surface is formed.

[Molding Step (S20)]

Figure 4:
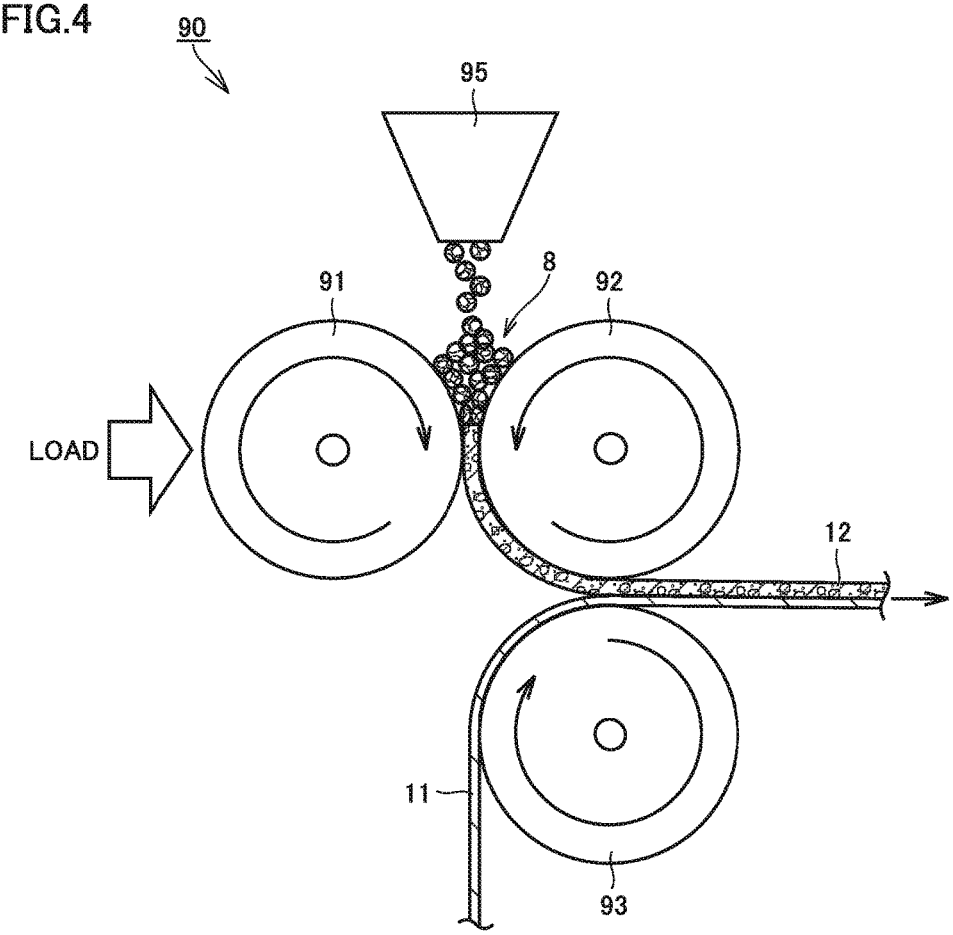
FIG. 4 is a schematic conceptual diagram illustrating the step of forming an electrode mixture layer and the step of placing the electrode mixture layer.

In the molding step (S20), the electrode mixture layer is formed by molding the above-described granulated material into a sheet. FIG. 4 is a schematic conceptual diagram illustrating the molding step (S20) and the below-described placement step (S30). With reference to FIG. 4, the molding step and the placement step will be described below.

An electrode manufacturing apparatus 90 shown in FIG. 4 includes a feeder 95 and three rolls (roll A 91, roll B 92, and roll C 93). The curved arrow drawn within each of the rolls indicates the direction of rotation of the roll. The granulated material is fed into feeder 95. Feeder 95 feeds granulated material 8 between roll A 91 and roll B 92. Granulated material 8 is conveyed along roll A 91 or roll B 92 to be fed through a gap between roll A 91 and roll B 92. At this time, in the present embodiment, PGFE adhered to the surfaces of the granules prevents the granules from adhering to one another. PGFE also imparts good fluidity to granulated material 8, so that granulated material 8 is fed through the gap in a state in which it is evenly distributed over the rolls. A predetermined load is applied to roll A 91. The granules are compacted together in the gap between roll A 91 and roll B 92, so that the granules are bonded to one another with the binder exuded together with the solvent from within the granules. Granulated material 8 is thus molded into a sheet-like electrode mixture layer 12. The coating weight of electrode mixture layer 12 can be adjusted with the gap.

[Placement Step (S30)]

In the placement step (S30), the electrode mixture layer is placed on electrode current collector foil. As shown in FIG. 4, electrode current collector foil 11 is conveyed along roll C 93 to be fed through the gap between roll B 92 and roll C 93. After passing through the gap between roll A 91 and roll B 92, electrode mixture layer 12 is conveyed along roll B 92 to be fed through the gap between roll B 92 and roll C 93.

Electrode mixture layer 12 is pressed against electrode current collector foil 11 in the gap between roll B 92 and roll C 93, and then conveyed away from roll B 92 to be compression bonded to electrode current collector foil 11. Electrode mixture layer 12 is thus placed on electrode current collector foil 11.

After electrode mixture layer 12 has been placed on electrode current collector foil 11, a drying step may be performed to volatilize the solvent remaining in electrode mixture layer 12. The drying step may be performed in a hot-air drying oven (not shown) provided on a path line after roll C 93, for example.

The electrode current collector foil having the electrode mixture layer placed on one surface thereof may be fed onto roll C 93 again, to thereby allow the electrode mixture layer to be placed on both surfaces of the electrode current collector foil.

A compression step may also be performed to adjust the thickness and the density of the electrode mixture layer. The compression step may be performed using a rolling mill, for example.

Figure 5:
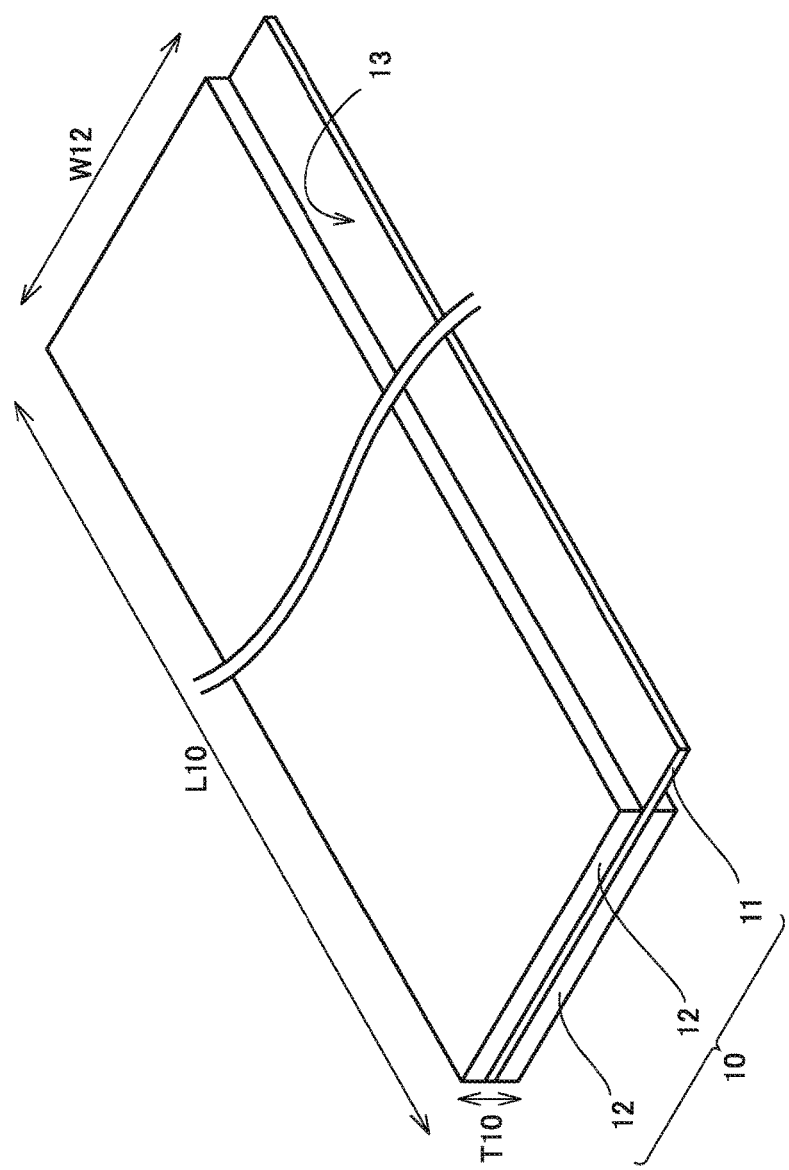
FIG. 5 is a schematic diagram showing one exemplary structure of the electrode sheet.

Lastly, the resulting material is cut into a predetermined size, using a slitter, for example, to thereby complete an electrode sheet 10 shown in FIG. 5.

[Electrode Sheet]

FIG. 5 is a schematic diagram showing one example of the electrode sheet according to the present embodiment. As shown in FIG. 5, electrode sheet 10 includes electrode current collector foil 11 and electrode mixture layers 12. The electrode current collector foil may have a thickness of about 5 to 20 μm, for example. In the case where the electrode sheet is a negative electrode sheet, the electrode current collector foil is copper (Cu) foil, for example, and in the case where the electrode sheet is a positive electrode sheet, the electrode current collector foil is aluminum (Al) foil, for example. Each of the electrode mixture layers may have a thickness of about 10 to 100 μm, for example.

Figure 6:
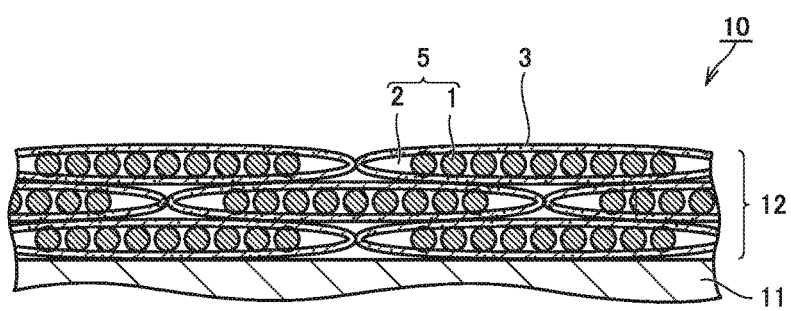
FIG. 6 is a schematic cross-sectional view showing one exemplary structure of the electrode sheet.

FIG. 6 is a schematic cross-sectional view showing one exemplary structure of the electrode sheet. The cross-sectional image as shown in FIG. 6 can be obtained by, for example, observing a cross section of the electrode sheet in the thickness direction thereof with an electron microscope (SEM) or the like. Electrode mixture layer 12 contains a plurality of granules 5. Each of granules 5 contains at least electrode active material 1 and binder 2. The granules may also contain the conductive material and the like, for example.

As shown in FIG. 6, granules 5 may in some cases have been significantly deformed as a result of the compaction and compression between the rolls. In the electrode mixture layer molded from the granulated material, however, boundaries between the granules can be identified through the observation of a cross section thereof. In the present embodiment, PGFE 3 is adhered to the boundaries between granules 5, i.e., to the surfaces of granules 5. PGFE may be adhered to at least a portion of the surface of each of the granules. PGFE may be adhered in any non-limiting state. For example, PGFE may be adhered as a film or a mass.

As described above, in the electrode mixture layer according to the present embodiment, the granules have a uniform granule size because of the lubricating effect of PGFE, and have reduced variations in density. As a result, the permeation path through which an electrolytic solution passes through the boundaries between the granules can be evenly distributed.

Repeated high-rate charging/discharging causes the electrode mixture layer to repeatedly undergo vigorous expansion and contraction. The expansion and contraction of the electrode mixture layer is mainly caused by the expansion and contraction of the electrode active material. Expansion of the electrode active material reduces the voids in which the electrolytic solution can be held within the electrode mixture layer, which forces the electrolytic solution out of the electrode mixture layer. On the other hand, contraction of the electrode active material causes voids to be formed again, which causes the electrolytic solution to be drawn back into the electrode mixture layer. At this time, if the granules are nonuniform in size, and the permeation path is unevenly distributed, the electrolytic solution cannot be readily returned into the electrode mixture layer. It is believed that this results in uneven distribution of the electrolytic solution in the in-plane direction of the electrode mixture layer, and causes a nonuniform electrode reaction, which promotes an increase in resistance.

In the electrode sheet according to the present embodiment, it is believed that the electrolytic solution can be readily returned because the permeation path of the electrolytic solution is evenly distributed, so that an increase in resistance during high-rate cycling can be prevented.

[Composition of Electrode Mixture Layer]

The composition of the electrode mixture layer reflects the proportions of solids contained in the granulated material. That is, the composition of the electrode mixture layer may, for example, be as shown below. In the following, the proportion of the conductive material is from about 0 to 10 mass %.

SBR (binder): about 0.5 to 1.5 mass %
CMC-based polymer (binder): about 0.1 to 1.4 mass %
PGFE: about 0.1 to 0.35 mass %
Balance: the electrode active material, the conductive material, and the like.

As described above, the binder preferably contains the CMC-based polymer. Furthermore, when the content of the CMC-based polymer and the content of PGFE satisfy a specific relation in the electrode mixture layer, improvement in the effect of preventing an increase in resistance can also be expected. That is, the electrode mixture layer preferably has a content of the CMC-based polymer not less than 0.2 mass % and not more than 1.2 mass %, a content of PGFE not less than 0.1 mass % and not more than 0.3 mass %, and a total content of the CMC-based polymer and PGFE not more than 1.4 mass %.

[Method for Manufacturing Nonaqueous Electrolyte Secondary Battery]

A method for manufacturing a nonaqueous electrolyte secondary battery, including the above-described method for manufacturing the electrode sheet according to the present embodiment, will be described. That is, the method for manufacturing a nonaqueous electrolyte secondary battery includes the steps of forming a granulated material containing a plurality of granules; forming an electrode mixture layer by molding the granulated material into a sheet; and placing the electrode mixture layer on electrode current collector foil, wherein the step of forming the granulated material includes the steps of forming a granule containing at least an electrode active material and a binder; and adhering a polyglycerol fatty acid ester to a surface of the granule.

The term "nonaqueous electrolyte secondary battery" may simply be referred to as a "battery", hereinafter. While an example where the present embodiment is applied to a prismatic battery is described hereinafter by way of example, the present embodiment is also applicable to a cylindrical battery, a laminate-type battery, and the like.

Figure 7:
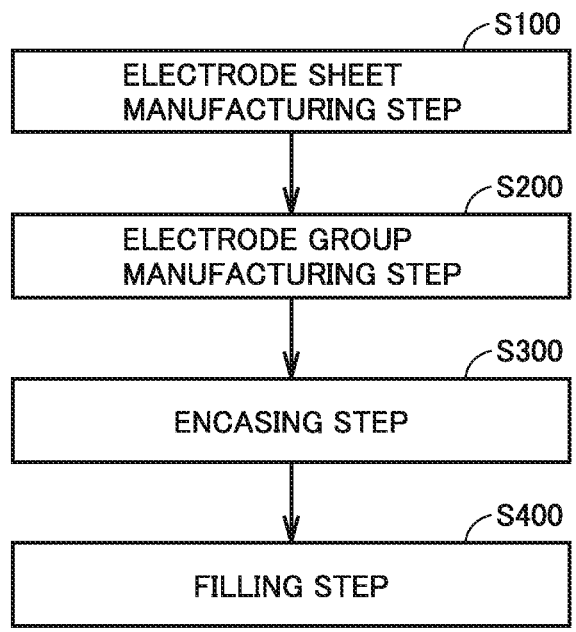
FIG. 7 is a flowchart showing an outline of a method for manufacturing a nonaqueous electrolyte secondary battery.

FIG. 7 is a flowchart showing an outline of the method for manufacturing a nonaqueous electrolyte secondary battery. The method for manufacturing a nonaqueous electrolyte secondary battery includes an electrode sheet manufacturing step (S100), an electrode group manufacturing step (S200), an encasing step (S300), and a filling step (S400). Each of these steps will be described below.

[Electrode Sheet Manufacturing Step (S100)]

In the electrode sheet manufacturing step (S100), at least one of a negative electrode sheet and a positive electrode sheet is manufactured in accordance with the method for manufacturing the electrode sheet described above. The electrode sheet has the structure shown in FIG. 5 or 8, for example. Electrode sheet 10, 20 is in the form of a long strip. In electrode sheet 10, 20, an exposed portion 13, 23 of electrode current collector foil 11, 21 exposed from electrode mixture layer 12, 22 is provided for connection with an external terminal 70, 72 (see FIG. 10).

[Electrode Group Manufacturing Step (S200)]

Figure 9:
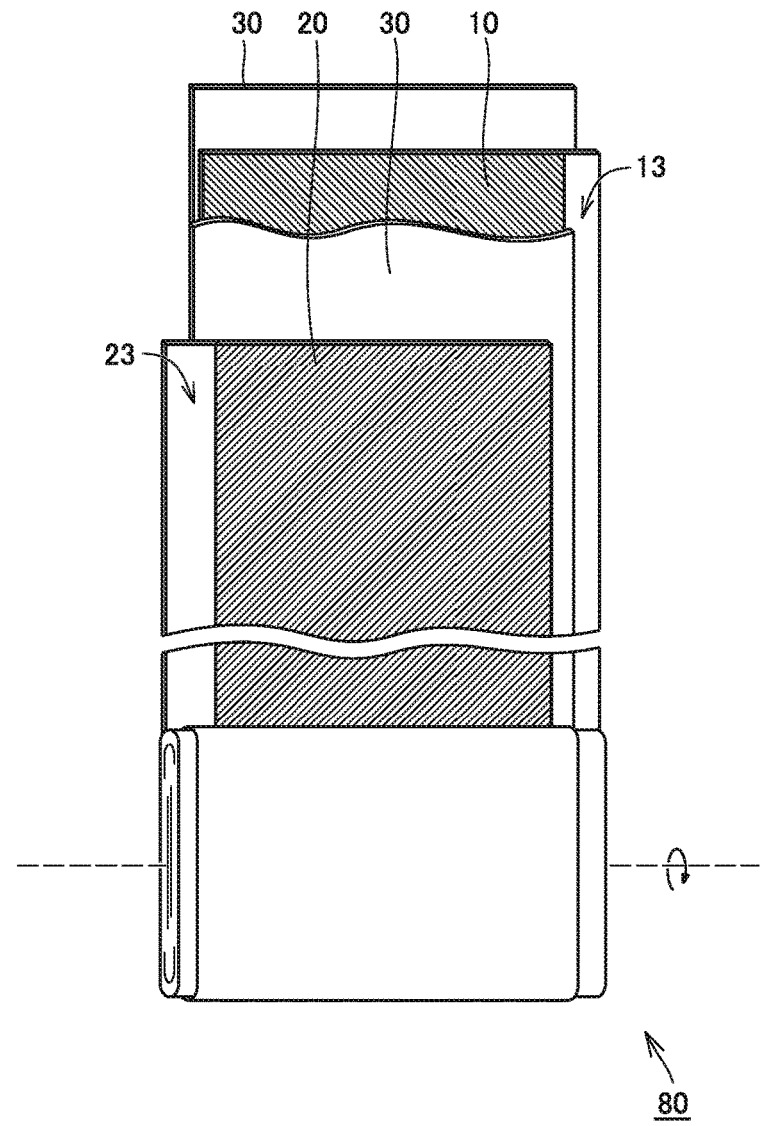
FIG. 9 is a schematic conceptual diagram showing one exemplary structure of an electrode group.

In the electrode group manufacturing step (S200), an electrode group is manufactured. FIG. 9 is a schematic diagram illustrating the structure of the electrode group. As shown in FIG. 9, an electrode group 80 is manufactured by stacking layers of a negative electrode sheet 10 and a positive electrode sheet 20 with a separator 30 therebetween, and then winding these stacked layers. After being wound, electrode group 80 may be molded to have a flat external shape, using a flat press machine, for example.

The separator may, for example, be a microporous film made of a polyolefin material such as polyethylene (PE) or polypropylene (PP), for example. The separator may have a thickness of about 5 to 30 μm, for example. The separator may be formed of a single layer or a plurality of layers. For example, the separator may have a three-layer structure in which layers of a microporous film of PE and a microporous film of PP are stacked in the order of PP/PE/PP. Alternatively, the separator may include a base material made of a microporous film such as PE or the like and a heat-resistant layer formed on the base material. The heat-resistant layer is formed of an inorganic filler such as alumina, or a heat-resistant resin such as aramid, for example.

[Encasing Step (S300)]

Figure 10:
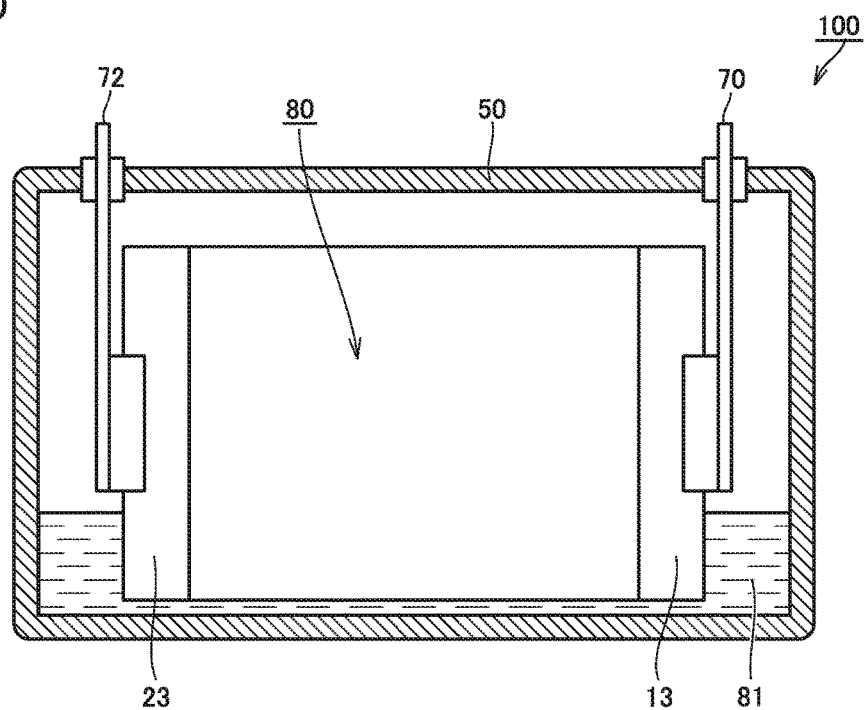
FIG. 10 is a schematic conceptual diagram showing one exemplary structure of the nonaqueous electrolyte secondary battery.

In the encasing step (S300), the electrode group is encased in a battery case. FIG. 10 is a schematic cross-sectional view showing one exemplary structure of the nonaqueous electrolyte secondary battery. The material of battery case 50 may be an Al alloy, for example. Battery case 50 may include a case main body and a lid. Battery case 50 may be provided with a safety valve, a filling hole, a current interrupt device, and the like. Electrode group 80 is connected to external terminals 70, 72 at exposed portions 13, 23.

[Filling Step (S400)]

In the filling step (S400), battery case 50 is filled with an electrolytic solution 81. Battery case 50 is filled with electrolytic solution 81 through a filling hole (not shown) provided in battery case 50, for example. After being filled, battery case 50 is sealed using a predetermined sealing means. As a result, a nonaqueous electrolyte secondary battery 100 is completed.

The electrolytic solution is a liquid electrolyte in which a supporting electrolyte is dissolved in an aprotic solvent. Examples of the aprotic solvent may include cyclic carbonates such as ethylene carbonate (EC), propylene carbonate (PC), butylene carbonate (BC), and γ-butyrolactone (GBL); and chain carbonates such as dimethyl carbonate (DMC), ethyl methyl carbonate (EMC), and diethyl carbonate (DEC). The aprotic solvent may be a mixed solvent containing a cyclic carbonate and a chain carbonate. The volume ratio of the cyclic carbonate to the chain carbonate in the mixed solvent may be about 1:9 to 5:5, for example.

Examples of the supporting electrolyte may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide [$Li(CF_3SO_2)_2N$], lithium bis(fluorosulfonyl)imide [$Li(FSO_2)_2N$], and lithium trifluoromethanesulfonate ($LiCF_3SO_3$). Two or more of these supporting electrolytes may be used in combination. The concentration of the supporting electrolyte in the electrolytic solution is about 0.5 to 2.0 mol/L, for example.

The electrolytic solution may contain additives with various functions. The electrolytic solution may contain an additive for promoting or preventing the formation of SEI (Solid Electrolyte Interface), for example. Examples of the additive may include lithium bis(oxalato)borate [$LiB(C_2O_4)_2$; abbreviated as "LiBOB"], lithium difluoro(oxalato)borate [$LiBF_2(C_2O_4)$], lithium difluorobis(oxalato)phosphate [$LiPF_2(C_2O_4)_2$], lithium difluorophosphate ($LiPO_2F_2$), vinylene carbonate (VC), vinyl ethylene carbonate (VEC), fluoroethylene carbonate (FEC), ethylene sulfite (ES), and propanesultone (PS).

The electrolytic solution may contain an additive for promoting an increase in internal pressure in the event of overcharging. Examples of the additive may include cyclohexylbenzene (CHB), biphenyl (BP), biphenyl ether (BPE), tert-butylbenzene (TBB), and tert-amyl benzene (TAB). The amount of the additive is about 0.1 to 5 mass %, for example.

[Nonaqueous Electrolyte Secondary Battery]

A nonaqueous electrolyte secondary battery including the above-described electrode sheet according to the present embodiment will be described. That is, the nonaqueous electrolyte secondary battery includes electrode current collector foil, and an electrode mixture layer placed on the electrode current collector foil, wherein the electrode mixture layer contains a plurality of granules, the granules contain at least an electrode active material and a binder, and the granules have a polyglycerol fatty acid ester adhered to a surface thereof.

As described above, the inclusion of the electrode sheet according to the present embodiment in the nonaqueous electrolyte secondary battery is expected to prevent an increase in resistance during high-rate cycling. The nonaqueous electrolyte secondary battery, therefore, is particularly suitable as a power source for power applications where high rate characteristics are important. Examples of such applications may include a power source for strong hybrid vehicles and a power source for electric vehicles.

EXAMPLES

The present embodiment will be described hereinafter with reference to examples, which are not intended to limit the present embodiment. While an example where the present embodiment is applied to a negative electrode sheet will be described hereinafter by way of example, the present embodiment is also applicable to a positive electrode sheet.

[Manufacture of Electrode Sheets]

Negative electrode sheets according to Nos. 1 to 18 were manufactured as follows. Here, the negative electrode sheets according to Nos. 1 to 14 correspond to examples, and the negative electrode sheets according to Nos. 15 to 18 correspond to comparative examples.

[No. 1]
1. Granulation Step (S10)
The following materials were prepared.
Electrode active material: graphite (mean particle size: 20 μm)
Binders: CMC-Na (product name "MAC500LC" from Nippon Paper Industries Co., Ltd.)
: SBR dispersion (solvent: water)
PGFE: product name "SY Glyster" from Sakamoto Yakuhin Kogyo Co., Ltd.
Solvent: water
1-1. Step of Forming Granule (S01)
Graphite, CMC-Na, the SBR dispersion, and water were introduced into the agitation vessel of High Speed Mixers (from Earth Technica Co., Ltd.), and agitation granulation was performed. A mass of granules containing the electrode active material and the binder was thus obtained. The granulation conditions were as follows.
Solids concentration: 79 mass %
Agitator (agitation blades): 300 rpm
Chopper (chopper blades): 1200 rpm
Agitation time: 3 minutes
1-2. Step of Adhering PGFE to Surface of Granule (S02)
Next, PGFE was additionally introduced into the agitation vessel of High Speed Mixers, and agitated. PGFE was thus adhered to surfaces of the granules. The agitation conditions were as follows.
Solids concentration: 71 mass %
Agitator: 400 rpm
Chopper: 2500 rpm
Agitation time: 5 minutes
As a result, a granulated material containing the granules was obtained. The final proportions of solids contained in the granulated material were as shown below. The granules had a mean granule size of 0.8 mm.
[Proportions of Solids]
SBR content: 1.0 mass %
CMC-Na content: 0.2 mass %
PGFE content: 0.1 mass %
Balance: electrode active material
2. Molding Step (S20)
The electrode manufacturing apparatus shown in FIG. 4 was prepared.
Electrode mixture layer 12 was formed by molding granulated material 8 into a sheet as described above, using electrode manufacturing apparatus 90. The coating weight (after drying) of the electrode mixture layer (one surface) was adjusted to 4.0 mg/cm$^2$.
3. Placement Step (S30)
Cu foil with a thickness of 14 μm was prepared as the electrode current collector foil. Electrode mixture layer 12 was placed on (both surfaces of) electrode current collector foil 11, as described above, using electrode manufacturing apparatus 90. As a result, the electrode sheet according to No. 1 was obtained.
[Nos. 2 to 16]
Electrode sheets according to Nos. 2 to 16 were obtained in the same manner as that for the electrode sheet according to No. 1, except that the contents of CMC-Na and PGFE in the granulated material were changed as shown in Table 1.

TABLE 1

| | Method for Manufacturing Electrode Sheet | | | | | Electrode Sheet Quality | | Battery Performance | |
|---|---|---|---|---|---|---|---|---|---|
| | Proportions of Solids | | | | | | | Initial | Resistance Increase Ratio after |
| No. | SBR Mass % | CMC—Na Mass % | PGFE Mass % | Total (CMC—Na + PGFE) Mass % | Notes | Coarse Granules Number/1000 cm$^2$ | Pinholes Number/1000 cm$^2$ | Resistance mΩ | Cycling % |
| 1 | 1.0 | 0.2 | 0.1 | 0.3 | PGFE was Mixed after Granulation | 0 | 0 | 3.5 | 105 |
| 2 | 1.0 | 0.2 | 0.2 | 0.4 | PGFE was Mixed after Granulation | 0 | 0 | 3.4 | 106 |
| 3 | 1.0 | 0.2 | 0.3 | 0.5 | PGFE was Mixed after Granulation | 0 | 0 | 3.3 | 105 |
| 4 | 1.0 | 0.5 | 0.1 | 0.6 | PGFE was Mixed after Granulation | 0 | 0 | 3.3 | 105 |
| 5 | 1.0 | 0.5 | 0.2 | 0.7 | PGFE was Mixed after Granulation | 0 | 0 | 3.2 | 103 |

TABLE 1-continued

| | Method for Manufacturing Electrode Sheet | | | | | Electrode Sheet Quality | | Battery Performance | |
|---|---|---|---|---|---|---|---|---|---|
| | Proportions of Solids | | | | | | | Initial | Resistance Increase |
| | | | | Total (CMC— | | | | | Ratio after |
| No. | SBR Mass % | CMC—Na Mass % | PGFE Mass % | Na + PGFE) Mass % | Notes | Coarse Granules Number/1000 cm² | Pinholes Number/1000 cm² | Resistance mΩ | Cycling % |
| 6 | 1.0 | 0.5 | 0.3 | 0.8 | PGFE was Mixed after Granulation | 0 | 0 | 3.2 | 104 |
| 7 | 1.0 | 1.0 | 0.3 | 1.3 | PGFE was Mixed after Granulation | 0 | 0 | 3.6 | 108 |
| 8 | 1.0 | 1.2 | 0.1 | 1.3 | PGFE was Mixed after Granulation | 0 | 0 | 3.5 | 106 |
| 9 | 1.0 | 1.2 | 0.2 | 1.4 | PGFE was Mixed after Granulation | 0 | 0 | 3.7 | 107 |
| 10 | 1.0 | 0.1 | 0.2 | 0.3 | PGFE was Mixed after Granulation | 0 | 0 | 6.4 | 136 |
| 11 | 1.0 | 0.1 | 0.35 | 0.45 | PGFE was Mixed after Granulation | 0 | 0 | 5.1 | 123 |
| 12 | 1.0 | 1.0 | 0.35 | 1.35 | PGFE was Mixed after Granulation | 45 | 23 | 4.8 | 131 |
| 13 | 1.0 | 1.2 | 0.3 | 1.5 | PGFE was Mixed after Granulation | 42 | 19 | 4.3 | 133 |
| 14 | 1.0 | 1.4 | 0.2 | 1.6 | PGFE was Mixed after Granulation | 68.7 | 43 | 6.8 | 135 |
| 15 | 1.0 | 0.2 | 0 | 0.2 | — | 124 | 321 | 6.5 | 121 |
| 16 | 1.0 | 1.4 | 0 | 1.4 | — | 250 | 386 | 4.5 | 120 |
| 17 | 1.0 | 0.5 | 0.2 | 0.7 | PGFE was Mixed before Granulation | 345 | 432 | 7.2 | 141 |
| 18 | 1.0 | 0.5 | 0.2 | 0.7 | Coating | 0 | 0 | 7.6 | 145 |

[No. 17]

Graphite, PGFE, the SBR dispersion, and water were introduced into the agitation vessel of High Speed Mixers, and mixed with agitation. After 3 minutes, CMC-Na was additionally introduced into the agitation vessel, and was mixed with agitation for additional 5 minutes. A powdery mixture was thus obtained. The final proportions of solids in the mixture were the same as those of the electrode sheet according to No. 5. Granules were not formed in this powdery mixture. This powdery mixture was fed into the electrode manufacturing apparatus shown in FIG. 4 similarly to the granulated material, to thereby manufacture an electrode sheet. The electrode sheet according to No. 17 corresponds to a comparative example in which PGFE was added before the formation of granules.

[No. 18]

A coating having the same proportions of solids as those of the electrode sheet according to No. 5 (solids concentration: 50 mass %) was prepared. The coating was applied to the electrode current collector foil using a die coater, and then dried, to thereby form an electrode mixture layer. An electrode sheet was otherwise obtained in the same manner as that for the electrode sheet according to No. 5. The electrode sheet according to No. 18 corresponds to a comparative example in which the electrode sheet was manufactured using the coating method.

[Evaluation of Sheet Quality]

A rectangular region with an area of 1000 cm² was defined in each of the electrode sheets. The rectangular region was visually observed to count the number of coarse granules and pinholes within the region. The results are shown in Table 1. In this evaluation, a coarse granule and a pinhole were defined as follows.

Coarse granule: a mass with a size of 0.5 mm or more.

Pinhole: a hole or a depression with a size of $\sqrt{5}$ mm or more (through which underlying Cu foil was visually observable).

[Manufacture of Nonaqueous Electrolyte Secondary Batteries]

Evaluation batteries with a rated capacity of 24 Ah were manufactured using the electrode sheets (negative electrode sheets) manufactured as above.

1. Electrode Sheet Manufacturing Step (S100)

1-1. Preparation of Negative Electrode Sheet

Each of the electrode sheets according to Nos. 1 to 18 was cut with a slitter, to thereby obtain a negative electrode sheet as shown in FIG. 5. Each of the dimensions shown in FIG. 5 was as follows.

Figure 8:
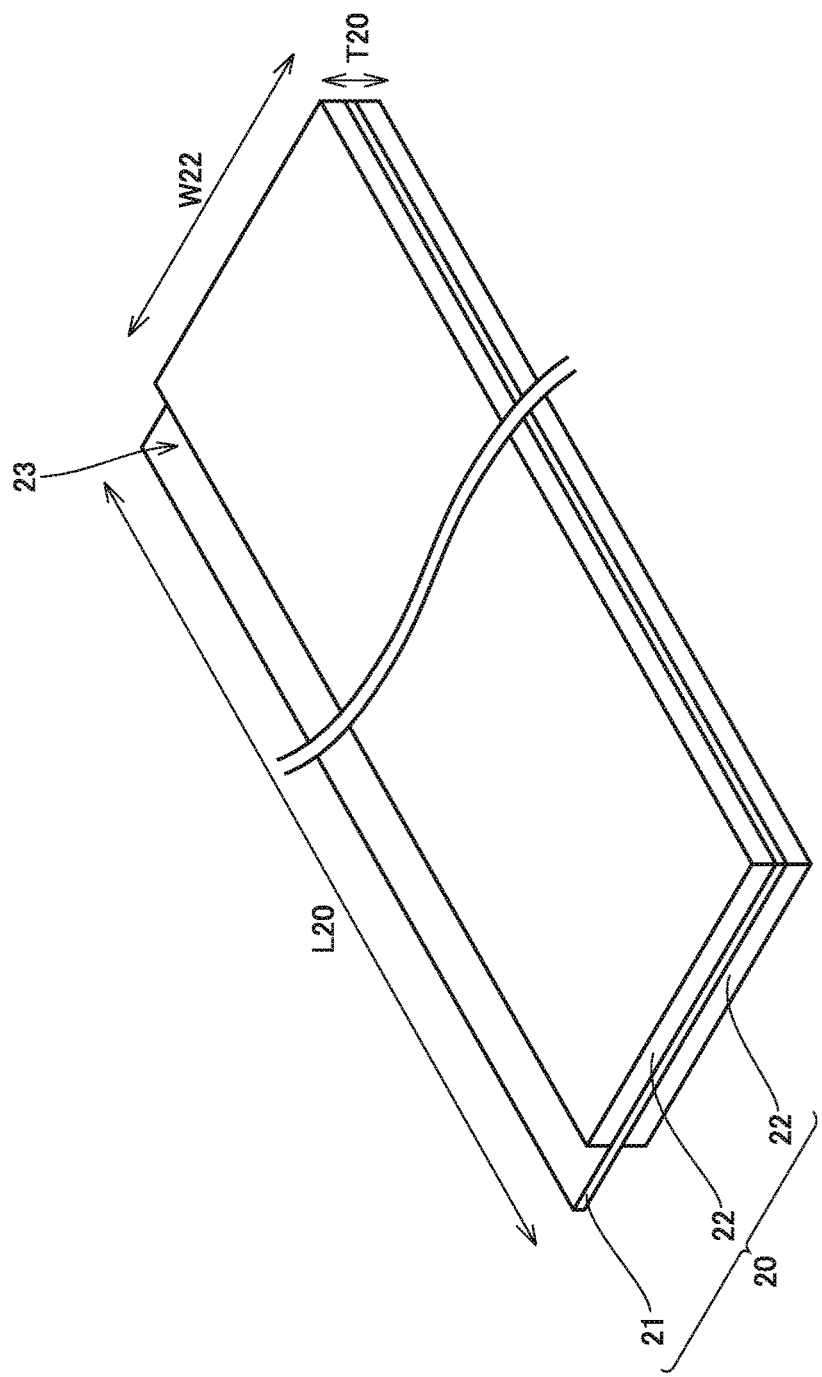
FIG. 8 is a schematic diagram showing another exemplary structure of the electrode sheet.

Sheet full length (L10): 4700 mm
Mixture layer width (W12): 100 mm
Sheet thickness (T10): 150 μm 1-2. Preparation of Positive Electrode Sheet A positive electrode sheet as shown in FIG. 8 was prepared. The structure of the positive electrode sheet was as follows.

Sheet full length (L20): 4500 mm
Mixture layer width (W22): 94 mm
Sheet thickness (T20): 170 μm
Positive electrode current collector foil: Al foil (thickness: 20 μm)
Positive electrode active material: $LiNi_{1/3}Co_{1/3}Mn_{1/3}O_2$
Conductive material: acetylene black
Binder: PVDF 2. Electrode Group Manufacturing Step (S200)

A separator (thickness: 25 μm) having a base material and a heat-resistant layer formed on the base material was prepared. The base material was a microporous film with a three layer structure of PP/PE/PP. The heat-resistant layer was a porous film made of alumina and an acrylic polymer.

As shown in FIG. 9, a wound-type electrode group was formed by stacking layers of negative electrode sheet 10 and positive electrode sheet 20 with separator 30 therebetween, and winding these stacked layers. The electrode group was then molded into a flat shape, using a flat press machine. The pressing conditions were as follows.

Pressing pressure: 4 kN/cm$^2$
Pressing time: 2 minutes

3. Encasing Step (S300)

As shown in FIG. 10, electrode group 80 was encased in battery case 50.

4. Filling Step (S400)

Electrolytic solution 81 with the composition shown below was allowed to fill through a filling hole in battery case 50. The filling hole was then sealed off to seal the battery case. As a result, nonaqueous electrolyte secondary batteries 100 according to Nos. 1 to 18 were obtained.

[Electrolytic Solution Composition]

Supporting electrolyte: $LiPF_6$ (1.0 mol/L)

Solvent composition: [EC:DMC:EMC=3:4:3 (volume ratio)]

Additives: CHB (1 mass %), BP (1 mass %), and LiBOB (1 mass %)

[Evaluation of Battery Performance]

The performance of each of the batteries obtained as above was evaluated as follows. In the following description, the unit "C" of a current value represents the current value at which a rated capacity of the battery is fully discharged in an hour.

1. Measurement of Initial Resistance

The battery was placed in a constant-temperature chamber set at 25° C. The SOC (State of Charge) of the battery was adjusted to 60%. Pulse discharge (current value=1 C, discharge time=10 seconds) was performed, and the amount of voltage drop was measured. IV resistance was determined from a relation between the amount of voltage drop and the discharge current. The results are shown in Table 1. Each of the values of initial resistance shown in Table 1 is an average of measured values of 10 batteries.

2. High-Rate Cycling Test

The battery was placed in a constant-temperature chamber set at 25° C. The SOC of the battery was adjusted to 60%. A charge/discharge cycle in which one cycle consists of a combination of the pulse charge and pulse discharge shown below was performed 3000 times.

Pulse charge: current value=10 C, charging time=80 seconds, and upper limit voltage=4.3 V.

Pulse discharge: current value=2 C, discharging time=400 seconds, and lower limit voltage=2.5 V.

After 3000 cycles, resistance after high-rate cycling was measured in the same manner as described in "1. Measurement of Initial Resistance" above. A resistance increase ratio (percentage) after cycling was determined by dividing the resistance after high-rate cycling by the initial resistance. The results are shown in Table 1.

[Results and Consideration]

The sample according to No. 18 was manufactured using the coating method. Although the sample according to No. 18 had a good electrode sheet quality, it was inferior in initial resistance and cycling characteristic. This is believed to be because the binder is unevenly distributed during drying of the coating.

The samples according to Nos. 15 and 16 did not contain PGFE. The samples according to Nos. 15 and 16 were inferior in electrode sheet quality. This is believed to be because the granules tend to agglomerate during the manufacturing process of the electrode sheets.

The sample according to No. 17 was obtained by mixing PGFE before forming the granules. The sample according to No. 17 had a poor electrode sheet quality, even though PGFE was used. This is believed to be because PGFE inhibits the formation of granules.

The samples according to Nos. 1 to 14 were obtained by adhering PGFE to the surfaces of granules after forming the granules. These samples had an improved electrode sheet quality over the samples according to Nos. 15 to 17. This is believed to be because PGFE prevents the agglomeration of the granules. These samples also had improved battery performance, and exhibited superior battery performance to that of the sample according to No. 18 (coating method).

It can be seen that in the samples according to Nos. 1 to 9 in which the solids of the granulated material, i.e., the electrode mixture layer, had a content of the CMC-Na not less than 0.2 mass % and not more than 1.2 mass %, a content of PGFE not less than 0.1 mass % and not more than 0.3 mass %, and a total content of the CMC-Na and PGFE not more than 1.4 mass %, the electrode sheet quality and the battery performance were improved compared to those of the samples according to Nos. 10 to 14 not meeting this requirement. This is believed to be because the granule size tends to be uniform within the above-defined range.

While embodiments of the present invention have been described as above, it should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

What is claimed is:

1. A method for manufacturing an electrode sheet comprising the steps of:
    forming a granulated material comprising a plurality of granules;
    forming an electrode mixture layer by molding the granulated material into a sheet; and
    placing the electrode mixture layer on electrode current collector foil,
    the step of forming the granulated material comprising the steps of:
        forming granules comprising at least an electrode active material and a binder;
        adding a polyglycerol fatty acid ester to the granules, and
        adhering the polyglycerol fatty acid ester to a surface of the granules to form the granulated material.

2. The method for manufacturing an electrode sheet according to claim 1, wherein the binder contains a carboxymethylcellulose-based polymer.

3. The method for manufacturing an electrode sheet according to claim 2, wherein
    the granulated material has a content of the carboxymethylcellulose-based polymer not less than 0.2 mass % and not more than 1.2 mass %, a content of the polyglycerol fatty acid ester not less than 0.1 mass % and not more than 0.3 mass %, and
    a total content of the carboxymethylcellulose-based polymer and the polyglycerol fatty acid ester not more than 1.4 mass %.

4. An electrode sheet obtained by the method according to claim 1, the electrode sheet comprising:
    the electrode current collector foil; and
    the electrode mixture layer placed on the electrode current collector foil, wherein the electrode mixture layer comprises the plurality of granules, the granules comprise at least the electrode active material and the binder, and the granules have a layer of the polyglycerol fatty acid ester adhered to a surface thereof.

5. The electrode sheet according to claim 4, wherein the layer of the polyglycerol fatty acid ester adhered to the surface of the granules consists essentially of the polyglycerol fatty acid ester.

6. The electrode sheet according to claim 4, wherein the layer of the polyglycerol fatty acid ester adhered to the surface of the granules consists of the polyglycerol fatty acid ester.

* * * * *